United States Patent [19]

Sato et al.

[11] Patent Number: 5,025,051

[45] Date of Patent: Jun. 18, 1991

[54] SYNTHETIC RESIN COMPOSITION

[75] Inventors: Yoshinori Sato; Hiroshi Akamine, both of Kazo, Japan

[73] Assignee: Ferro Corporation, Cleveland, Ohio

[21] Appl. No.: 446,891

[22] Filed: Jun. 15, 1989

[30] Foreign Application Priority Data

Oct. 20, 1987 [JP] Japan .................................. 62-265088
Sep. 13, 1988 [JP] Japan .................................. 63-227604

[51] Int. Cl.$^5$ ................................................ C08K 5/34
[52] U.S. Cl. ...................................... 524/99; 524/582; 524/585; 524/575; 524/401
[58] Field of Search ............................................. 524/99

[56] References Cited

FOREIGN PATENT DOCUMENTS 0212559 3/1987 European Pat. Off. .
0290391 11/1988 European Pat. Off. .............. 524/99

Primary Examiner—Joseph L. Schofer
Assistant Examiner—Mark D. Sweet
Attorney, Agent, or Firm—Daniel J. Hudak Co.

[57] ABSTRACT

This invention relates to synthetic resin compositions comprising a mixed product of (a) a compound having at least one piperidyl group, (b) perchloric acid and (c) optionally an inorganic substance other than perchloric acid in an amount of 0.01–10 parts by weight based on a synthetic resin, for example, a halogen-containing resin.

The compositions of this invention exhibit very excellent light resistance and heat resistance.

9 Claims, No Drawings

SYNTHETIC RESIN COMPOSITION

TECHNICAL FIELD

This invention relates to synthetic resin compositions. More specifically, this invention relates to synthetic resin compositions excellent in light resistance and heat resistance.

TECHNICAL BACKGROUND

It has generally been known that molded articles of synthetic resins such as polyvinyl chloride, a polyethylene and an ABS resin, when used out of doors for a long period of time, are affected by sunrays such as ultraviolet rays, heat rays, etc., and a decline in their mechanical strength or a change in their color is caused thereby. In order to prevent these phenomena, there have been used various ultraviolet ray stabilizers of the benzophenone, benzotriazole, benzoate or piperidine series. Out of these ultraviolet ray stabilizers, the compounds having piperidyl groups, i.e. the so-called hindered amine-type ultraviolet ray stabilizers have been universally used for synthetic resins because of their excellent property of stabilizing ultraviolet rays, and there has been extensively made a study of development and application thereof.

It has been known, however, that when compounds having piperidyl groups per se are singly blended with synthetic resins as an ultraviolet ray stabilizer, the activity of the piperidyl groups is imparted by substances contained in said resins and detrimental to the piperidyl groups. As the origin of such substances detrimental to the piperidyl groups, there may be mentioned, for example, catalyst residues at the time of polymerization of said resins, various heat stabilizers for imparting heat stability at the time of processing at high temperatures, halogen-containing resins which per se have detrimental halogens, synthetic resins having fire retardants of the halogen series blended therewith, etc.

Compound having piperidyl groups are affected in some way or other by such substances as above contained in synthetic resins and at the time of processing at high temperatures, and there has been observed a decline in the effect of blending.

DISCLOSURE OF THE INVENTION

It is an object of this invention to provide novel synthetic resin compositions.

It is another object of this invention to provide synthetic resin compositions excellent in light resistance and heat resistance.

It is a further object of this invention to provide novel synthetic resin compositions which can exhibit at its maximum an improvement of light resistance and heat resistance based on compounds having at least one piperidyl group.

The further object and advantages of this invention will be made clear from the below description.

The above objects and advantages of this invention, according to this invention, can be achieved by synthetic resin compositions comprising (A) 100 parts by weight of a synthetic resin and
(B) 0.01–10 parts by weight of a mixed product of
(a) a compound having at least one piperidyl group,
(b) perchloric acid, and
(c) optionally, an inorganic substance other than perchloric acid.

The mixed product (B) used in this invention is a mixed product of (a) a compound having at least one piperidyl group and (b) perchloric acid, or a mixed product of (a), (b) and (c) an inorganic substance other than perchloric acid. As the compound having at least one piperidyl group, there may be mentioned, for example, a compound expressed by the below formula (1):

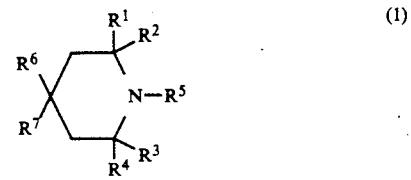

wherein $r^1$, $R^2$, $R^3$ and $R^4$ are identical or different and each denote a hydrogen atom or an alkyl group having 1–4 carbon atoms; $R^5$ denotes a hydrogen atom, an alkyl group having 1–4 carbon atoms, a hydroxy alkyl group having 2–4 carbon atoms or an acyl group having 2–4 carbon atoms; and $R^6$ and $R^7$ are identical or different and each denote a monovalent organic group, for example, an acyloxy group and a substituted amino group, or $R^6$ and $R^7$ may together form a substituted alkylenedioxy group, or a polymer expressed by the below formula (2):

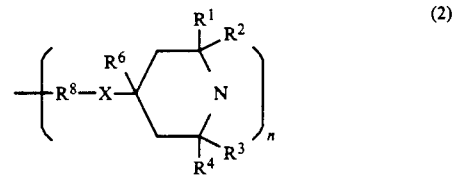

wherein the definitions of $r^1$, $R^2$, $R^3$ and $R^4$ and $R^6$ are the same as in the above formula (1); X denotes a group -NH- or -COO-; $R^8$ denotes a divalent organic group; and n is a number showing a degree of polymerization.

As the compounds having piperidyl groups used in this invention, for example, as compounds covered by the above formula (1), there may be mentioned the below compounds:

2,2,6,6-tetramethyl-4-piperidylbenzoate:

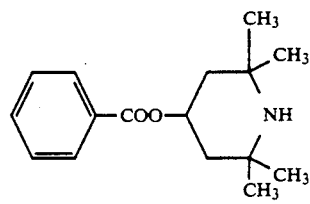

N-hydroxyethyl-2,2,6,6-tetramethyl-4-piperidynol-bis(3,5-di-t-butyl-4-hydroxyphenyl-propionate):

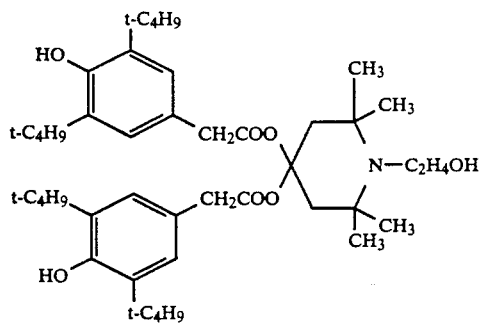

Bis(2,2,6,6-tetramethyl-4-piperidyl) sebacate:

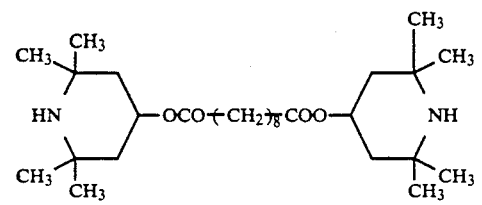

Bis(1,2,2,6,6-pentamethyl-04-piperidyl) sebacate:

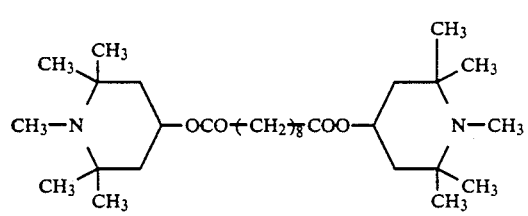

Bis(1,2,2,6,6-pentamethyl4-piperidyl)-2-n-butyl-2-(3,5-di-t-butyl-4-hydroxybenzyl) malonate:

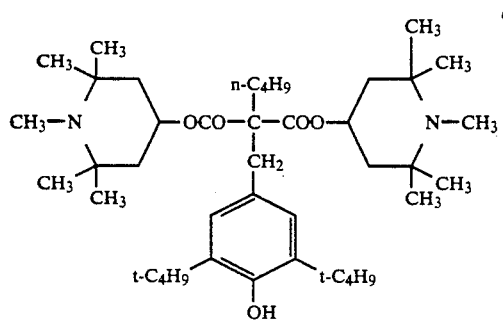

Tris(2,2,6,6-tetramethyl-4-piperidyl) nitrilotriacetate:

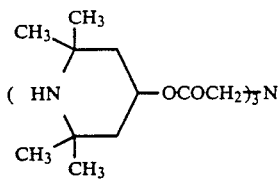

Tetrakis(2,2,6,6-tetramethyl-4-piperidyl)-1,2,3,4-butanetetracarboxylate:

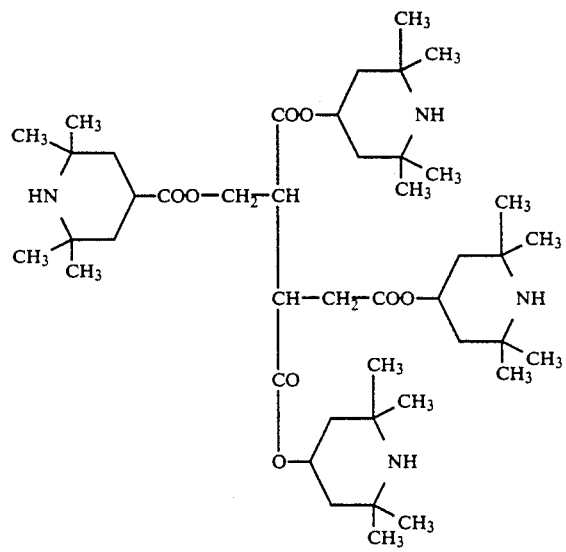

Bis(9-aza-8,8,10,10-tetramethyl03-ethyl-1,5-dioxas-piro [5,5 --3-undercylmethyloxycarbonyloxy)-4,4'-iso-propylidenebiscyclohexane:

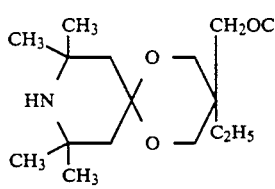 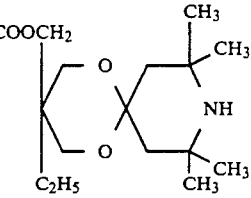

Bix(9-aza-8,8,10,10-tetramethyl-3-hydroxy-methyl-1,5-dioxaspiro [5,5]-3-undercylmethyl) ether:

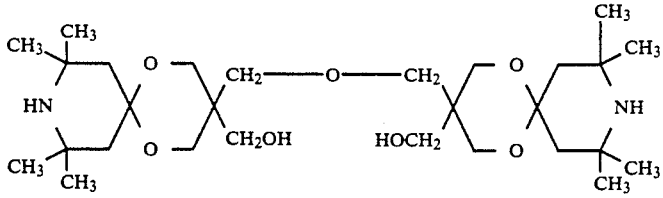

[2-[(2,2,6,6-tetramethyl-4-piperidyl)imino]2-butyryl[(2,2,6,6-tetramethyl-4-piperidyl)-imino]:

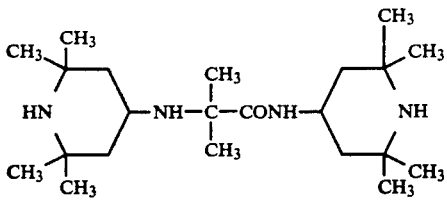

Further, as polymers covered by the above formula (2), there may be mentioned, for example, N-hydroxyethyl02,2,6,6-tetramethyl04piperidynol/dimethyl succinate condensate:

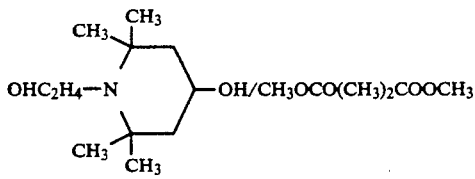

Cyaurie chloride/t-octylamine/bis(2,2,6,6-tetramethyl-4-piperidylamino)hexame condensate:

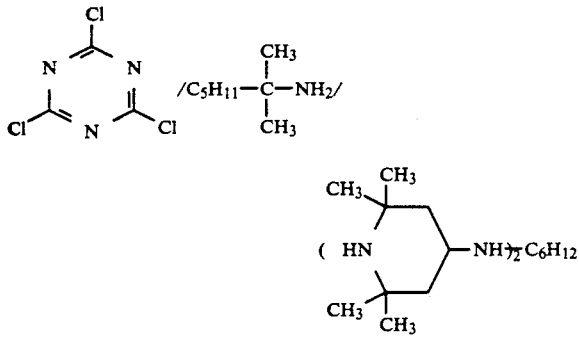

Poly[6-morpholino-1,3,5-triazine-2,4-diyl]-[(2,2,6,6-tetramethyl-4-piperidyl)imino]hexamethylene[(2,2,6,6-tetramethyl-4-piperidyl-imino)]:

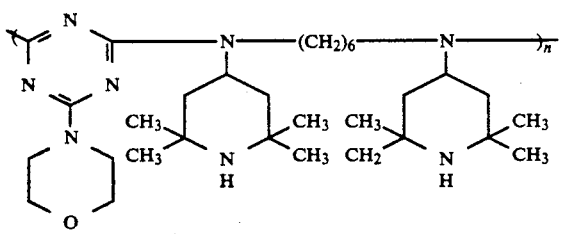

As the compounds having piperidyl groups used in this invention, there are preferred compounds expressed by the above formula (1) and having 1 to 4 piperidyl groups. More preferably, these compounds have a molecular weight of 80-800.

The polymers expressed by the above formula (2) have at least n piperidyl groups. n is usually a number of 2-15.

Further, for the mixed product used in this invention, there are used (b) perchloric acid and optionally an inorganic substance other than perchloric acid.

As the inorganic substance other than perchloric acid, there may be mentioned, for example, an oxide, hydroxide, inorganic acid salt, basic inorganic acid salt or double salt of at least one metal selected from the group consisting of Li, Na, K, Mg, Ca, Sr, Ba, Zn, Al, Sn and Pb, further a metallic aluminum powder, or a metal oxide such as $SnO_2$, $TiO_2$ or $ZrO_2$.

As the oxide of the metal mentioned in the above group, there may be mentioned, for example, MgO, CaO, BaO, ZnO, $SrO_2$, or PbO, and as the hydroxide of said metal, there may be mentioned, for example, LiOH, $Mg(OH)_2$, $Ca(OH)_2$ or $Al(OH)_3$.

As the inorganic acid which provides an inorganic acid salt or basic inorganic acid salt of a metal, there may be mentioned, for example, phosphoric acid, phosphorus acid, sulfuric acid, sulfurous acid, nitric acid, nitrous acid, carbonic acid, boric acid or silicic acid.

The inorganic acid salt or basic inorganic acid salt can be produced by an ordinary method such as coprecipitation or fusion, for example, from the abovementioned inorganic acid and metal or an oxide or hydroxide of said metal.

The basic inorganic acid salt may also be an optional mixture of an inorganic acid salt and an oxide or hydroxide.

These salts may also be in the form of a double salt. Further, these salts may also be anhydrides or those having crystal water.

As the inorganic acid salt in the form of an anhydride, there may be mentioned, for example, $LiSiO_3$, $Na_2SO_4$, $Na_2HPO_4$, $K_2CO_3$, $Mg(PO)_2$, $Mg(NO_3)_2$, $CaCO_3$, $SrHPO_4$, $BaSiO_3$, $ZnPO_4$, $Al_2(HPO_3)_3$, $SnHPO_3$, $PbSiO_3$, $ZnB_4O_7$ or $Ba(BO_2)_2$.

As the basic inorganic acid salt in the form of an anhydride, there may be mentioned, for example, $2CaO.Na_3PO_4$, $MgO.K_2SiO_3$, $Mg(OH)_2.MgCO_3$, $Al(OH)_3.MgSO_4$, $3CaO.Ca_3(PO_4)_2$, $Sr(OH)_2.Sr_3(PO_4)_2$, $3BaO.Ba_2SiO_3$, $2ZnO.ZnHPO_3$, $Al_2O_3.Al(PHO_3)_3$, $3SnO.Sn_3(PO_4)_2$, $3PbO.PbSO_4$ or $5Ca(OH)_2.Ca_2(BO_3)_2$.

Further, in this invention, as the inorganic salt, there may be used a complex compound of Mg and Al hydroxide having a composition expressed by the below formula:

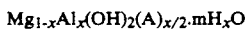

wherein x is a number which satisfies $0 < x \leq 0.5$,

A is $CO_3^{2-}$ or $SO_3^{2-}$, and m is a number of 0-5, which is known as a hydrotalcite compound. A compound having a composition equivalent to the composition in which in the above compositional formula, part or all of Mg has been substituted with a divalent metal such as Ca, Sr, Ba or Zn can also be used as the inorganic salt.

As the inorganic substance, the above-mentioned compounds may be used singly or in combination.

The mixed product (B) used in this invention can be prepared by mixing a compound (a) having at least one piperidyl group and perchloric acid (b) and optionally an inorganic substance (c) other than perchloric acid in an optional order. When the compound (a) and the perchloric acid (b) are used, it is a matter of course to mix these compounds with each other. When the compound (a), the perchloric acid (b) and the inorganic substance (c) are used, there may be mentioned four methods: a method of first mixing the compound (a) with the inorganic substance (c) and then mixing the mixture with the compound (b); a method of first mixing the compound (a) with the compound (b) and then mixing the mixture with the inorganic substance (c); a method of first mixing the inorganic substance (c) with the compound (b) and then mixing the mixture with the compound (a); and a method of simultaneously mixing the compound (a), the inorganic substance (c) and the compound (b). Of these methods, the method of first mixing the compound (a) with the inorganic substance (c) and then mixing the mixture with the compound (b) is preferred, because the resulting mixed product is obtained as a comparatively good powdery substance. If the resulting mixed product is in not very good powdery conditions, it is desirable to pulverize the mixed product into a good powdery substance for use.

The mixed product used in this invention has an average particle diameter of preferably 100–1 μm, more preferably 10–1 μm.

The ingredients may be mechanically and directly mixed using no medium. They can also be mixed in an inert medium such as an alcohol, for instance.

Proportions in which the compound (a), perchloric acid (b) and inorganic substance (c) are mixed may be 0.05–19 parts by weight each of the perchloric acid (b) and inorganic substance (c) per 1 part by weight of the compound (a), but more preferably 0.1–5 parts by weight of the perchloric acid (b) and 0.1–16 parts by weight of the inorganic substance (c) per 1 part by weight of the compound (a). The most preferable proportions are those within the above-mentioned ranges and in which, for instance, the resulting mixed product has not a pH of 3 or below, i.e. strong acidity.

It is not necessarily clear what compound the mixed product (B) used in this invention is. It is believed, however, that when the compound (a) is expressed, for example, by the above formula (1), between the compound (a) and the perchloric acid (b), there is formed an addition compound which is expressed by the below formula (1)':

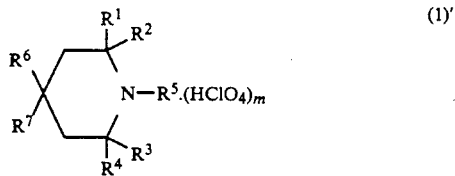

wherein the definitions of $R^1$–$R^5$ are the same as defined in the formula (1), and m is a number of 0.01–1.

Further, it is suggestive, it is believed, that as a compound which is formed among the compound (a), the perchloric acid (b) and the inorganic substance (c), between the perchloric acid (b) and the inorganic substance (c), there is formed a compound expressed by the below formula:

$$Mg_{4.5}Al_2(OH)_{13}\cdot(CO_3)_{0.5}(ClO_4)_{1.0}\cdot 3.5H_2O$$

or $$Mg_{4.5}Al_2(OH)_{13}\cdot(ClO_4)_{2.0}\cdot 3.5H_2O$$

in accordance with an amount of the perchloric acid (b) in the case where the inorganic substance (c) is a hydrotalcite group compound having a composition, for example, of $Mg_{4.5}Al_2(OH)_{13}\cdot CO_3\cdot 3.5H_2O$, or there is formed a compound expressed by the below formula:

$$Mg(OH)(ClO_4)\cdot H_2O$$

or $$Mg(ClO_4)_2\cdot 2H_2O$$

in accordance with an amount of the perchloric acid (b) in the case where the inorganic substance (c) is magnesium hydroxide.

As the synthetic resin (A) used in this invention, there may be mentioned, for example, a halogen-containing resin, a polyolefin resin, a copolymer of an olefin and a vinyl group-containing carboxylic acid or its ester, a styrene resin, a polyester resin, a polyamide resin, a polyacrylonitrile resin, a polymethacrylic resin, a polycarbonate resin, a polyacetal resin, a polyvinyl acetate resin, a polyurethane resin, an epoxy resin, an urea resin, a melamine resin, and a phenol resin.

Of these resins, as the halogen-containing resin, there may be mentioned, for example, polyvinyl chloride, polyvinyl bromide, polyvinyl fluoride, polyvinylidene chloride, chlorinated polyethylene, chlorinated polypropylene, brominated polyethylene, chlorinated rubber, a vinyl chloride/vinyl acetate copolymer, a vinyl chloride/ethylene copolymer, a vinyl chloride/propylene copolymer, a vinyl chloride/styrene copolymer, a vinyl chloride/isobutylene copolymer, a vinyl chloride/vinylidene chloride copolymer, a vinyl chloride/styrene/maleic anhydride terpolymer, a vinyl chloride/styrene/acrylonitrile copolymer, a vinyl chloride/butadiene copolymer, a vinyl chloride/isoprene copolymer, a vinyl chloride/chlorinated propylene copolymer, a vinyl chloride/vinylidene chloride/vinyl acetate terpolymer, a vinyl chloride/acrylate copolymer, a vinyl chloride/maleate copolymer, a vinyl chloride/methacrylate copolymer, a vinyl chloride/acrylonitrile copolymer, a vinyl chloride/urethane copolymer, etc.

As the polyolefin resin, there may be mentioned, for example, polyethylene, polypropylene, polybutylene, polyisobutylene, etc.

As the copolymer of an olefin and a vinyl group-containing carboxylic acid or its ester, there may be mentioned, for example, a copolymer of an olefin such as ethylene, propylene, butylene or isobutylene and a vinyl group-containing carboxylic acid or its ester such as vinyl acetate, vinyl propionate, vinyl benzoate, acrylic acid, methacrylic acid, an acrylic ester or methacrylic ester.

As the styrene resin, there may be mentioned, for example, polystyrene, AS, ABS, etc.

As the polyester resin, there may be mentioned, for example, polyethylene terephthalate, polybutylene terephthalate, etc.

Though there have been given no examples of the other synthetic resins, this invention is applied to synthetic resins known to persons skilled in the art.

Further, a blend of synthetic resins, for example, the so-called polymer blend such as a blend of a vinyl chloride resin and an ABS resin or a blend of a vinyl chloride resin and a polyurethane resin is also used as the synthetic resin (A) in this invention.

The synthetic resin compositions of this invention contain 0.01–10 parts by weight of the mixed product (B) in this invention per 100 parts by weight of the synthetic resin (A). If the amount of said mixed product is below the lower limit, said mixed product will have little effect. If the amount of said mixed product exceeds the upper limit, no effect can be expected from the increased amount, and this is useless from the mixed product economical point of view. Preferably, said is contained in an amount of 0.1–3 parts by weight based on the same as above.

The synthetic resin is blended with a fire retardant for the purpose of making the resin fire retardant. The compositions of this invention also exhibit an improvement effect in the case where there is blended a fire retardant, especially a retardant of the halogen series.

The compositions of this invention containing a fire retardant, for example, a fire retardant of the halogen series exhibit more excellent stability to ultraviolet rays and more excellent fire retardancy than known resin compositions containing an ultraviolet stabilizer having piperidyl groups and a fire retardant of the halogen series.

As the fire retardant of the halogen series which is used for the composition of this invention, there may be mentioned, for example, halogen-containing phosphoric esters, aliphatic chlorides, aliphatic bromides, aromatic chlorides, aromatic bromides, etc., i.e. halogen-containing phosphoric esters such as trischloroethyl phosphate, tris(dichloropropyl) phosphate, trischloropropyl phosphate, tris-dichloropropyl chloropropyl phosphate, bischloropropyl dichloropropyl phosphate, bischloropropyl chloroethyl phosphate, bischloroethyl dichloropropyl phosohate, tris(dibromopropyl) phosphate and tris(-bromochloropropyl) phosphate; and chlorides or bromides of aliphatic or aromatic hydrocarbons such as acetylene tetrabromide, dibromotetrachloroethane, tetrabromoethane, tetrabromobutane, acetic acid dibromide, ethylbenzene pentabromide, benzene tetrabromide, benzene pentabromide, benzene hexabromide, pentabromo-cyclohexane chloride, ethane hexachloride, methane diiodide, ammonium bromide, brominated polyphenyl, chlorinated polyphenyl, perchloropentacyclodecane, 1,2-dibromo-3-chloropropane, 1,2,3-tribromopropane, hexabromocyclododecane, chlorinated diphenyl, chlorotetrabromoethane, tetrabromobisphenol A, tetrabromophthalic anhydride, hexabromocyclododecane, bis(bromoethylether)tetrabromobisphenol A, tetrachlorophthalic anhydride, chlorendic acid, chlorentic acid, chlorinated paraffin, tribromopolystyrene and decabromodiphenoxyethane.

The compositions of this invention exhibit especially excellent light resistance and heat resistance in the case where the synthetic resin (A) is a halogen containing resin and/or contains a fire retardant of the halogen series.

Further, for the compositions of this invention, there may be used one or more types of common additive according to types of the synthetic resin. As such additives, there may be mentioned, for example, antioxidants, organic phosphite compounds, ultraviolet stabilizers, metal salts of organic acids, oxides of metals, hydroxides of metals, basic salts of inorganic acids, hydrotalcite compounds, metal salts of organic phosphoric acid, polyols, nitrogen-containing nonmetallic compounds, beta-diketone compounds, epoxy compounds, organic tin compounds, etc.

Of these common additives, metal salts of organic acids and organic phosphite compounds have the effect of further improving the properties of the compositions of this invention.

As such organic acids, for example, carboxylic acids or phenols are preferred, and as the salts thereof, for example, salts of Li, Na, K, Mg, Ca, Sr, Ba, Cd, Pb and Sn are preferred. As such carboxylic acids, there may be mentioned, for example, formic acid, acetic acid, propionic acid, butyric acid, valeric acid, caproic acid, caprylic acid, 2-ethylhexoic acid, tridecanoic acid, capric acid, undecanoic acid, lauric acid, myristic acid, palmitic acid, stearic acid, isostearic acid, 12-hydroxystearic acid, oleic acid, linoleic acid, linolenic acid, thioglycolic acid, mercaptopropionic acid, laurylmercaptopropionic acid, benzoic acid, p-t-butylbenzoic acid, dimethylbenzoic acid, aminobenzoic acid, salicylic acid, amino acid, glutamic acid, oxalic acid, glutaric acid, succinic acid, malonic acid, adipic acid, phthalic acid, fumaric acid, maleic acid, malic acid, citric acid, tartaric acid, thiodipropionic acid, trimellitic acid, pyromellitic acid, mellitic acid, etc.

As examples of the phenols, there may be mentioned phenol, nonylphenol, t-butylphenol, octylphenol, isoamylphenol, cresol, xylate, etc.

As examples of preferred organic phosphite compounds, there may be mentioned isooctylphosphite, phosphite, trilaurylphosphite, tristearylphosphite, tridipropyleneglycolphosphite, diphenylphosphite, triisononylphenylphosphite, triphenylphosphite, diphenylisodecylphosphite, diphenylisooctylphosohite, phenyldiisooctylphosphite, diisodecylpentaerythritoldiphosphite, tetraphenyldipropyleneglycoldiphosphite, polydipropyleneglycolphenylphosphite, trilauryltrithiophosphite, trisnonylphenylphosphite, distearylpentaerythritoldiphosphite, bis(2,4-di-t-butylphenyl)pentaerythritoldiphosphite, dilaurylphosphite, ditridecylphosphite, ethylhexyldiphenylphosphite, phenylneopentyleneglycolphosphite, heptakistripropyleneglycolphosphite, diphenyldidecyl(2,2,4-trimethyl-1,3-pentadiol)diphosphite, diisooctylphenylphosphite, poly4,4'-isopropylidenephenolneodol 25 alcohol phosphite, etc. Further, fire retardant aids such as antimony trioxide and inorganic borates, plasticizers, lubricants, pigments, foaming agents, fillers, antistatic agents, heavy metal-inactivating agents, nucleating agents, processing aids, etc. may be added, as required, to the compositions of this invention.

With reference to examples, this invention will be more specifically described below.

Table 1 below shows mixed products used in Examples 1–16 and compounds having piperidyl groups used for the production thereof.

TABLE 1

| Compound having piperidyl group | | Mixed product Amount of compound used | | |
|---|---|---|---|---|
| Compound | abb. | Piperidyl compound | Perchloric acid (in terms of 100% perchloric acid) | abb. |
| Bis(2,2,6,6-tetramethyl-4-piperidyl)sebacate | a | 481 g | 200 g | A |
| " | a | 481 | 100 | B |
| 2-[(2,2,6,6-tetramethyl-4-piperidyl)imino]-2-butyryl[(2,2,6,6-tetramethyl-4-piperidyl)imino] | c | 381 | 200 | C |
| Bis(1,2,2,6,6-pentamethyl-4-piperidyl]-2-n-butyl-2-(3,5-di-t-butyl-4-hydroxybenzyl)- | d | 685 | 200 | D |

TABLE 1-continued

| Compound having piperidyl group | | Mixed product Amount of compound used | | |
|---|---|---|---|---|
| | | | Perchloric acid (in terms of 100% per- | |
| Compound | abb. | Piperidyl compound | chloric acid) | abb. |
| malonate | | | | |
| Cyanuric chloride/t-octylamine/bis(2,2,6,6-tetramethyl-4-piperidylamine]hexane condensate | e | 250 | 20 | E |
| Poly[6-morpholino-1,3,5-triazine-2,4-diyl]-[(2,2,6,6-tetramethyl-4-piperidyl)imino]hexamethylene[(2,2,6,6-tetramethyl-4-piperidyl)-imino] | f | 150 | 54 | F |

The mixed products were prepared as below. Preparation of mixed products A, B and D:

Bis(2,2,6,6-tetramethyl-4-piperidyl)sebacate (a) (481 g) was dissolved in 200 g of methanol, and 334 g of an aqueous solution of 60 % perchloric acid (200 g in terms of 100 % perchloric acid) was dropwise added thereto with stirring. After the dropwise addition, the stirring was continued for 1 hour, and the solvent was evaporated to give a white-colored powdery product (A) having a melting point of 140°–150° C.

In the same way as above, mixed products B and D were prepared respectively using compounds b and d as compounds having piperidyl groups. Preparation of mixed products E, F and C:

An aqueous solution of 20 % perchloric acid (100 g) (20 g in terms of 100 % perchloric acid) was dropwise added with stirring to 250 g of a cyanuric chloride/t-octylamino/bis(2,2,6,6-tetramethyl-4piperidylamino)-hexane condensate (e). After the dropwise addition, the stirring was continued for about 1 hour, and drying was carried out under reduced pressure to give a white-colored powder (E) having a melting point of 135°–160° C.

In the same way as above, mixed products F and C were prepared respectively using compounds f and c as compounds having piperidyl groups.

EXAMPLES 1–4 and COMPARATIVE EXAMPLES 1–3

In each run, test sheets having a thickness of 0.5 mm were prepared by means of a kneading roll using a blend of the below formulation:

| Polyvinyl chloride | 100 parts by weight (halogen resin) |
|---|---|
| DOP | 40 parts by weight |
| Epoxidized soybean oil | 1.0 parts by weight |
| TiO$_2$ | 1.0 parts by weight |
| Ba-nonylphenate | 0.8 parts by weight |
| Zn-stearate | 0.2 parts by weight |
| Mixed product | 0.2 parts by weight |

The test sheets were examined for discoloration under the conditions of 180°C., 15 minutes and 30 minutes using a Geer oven, and a degree of discoloration was visually judged. Further, a degradation by light was measured using a sunshine weatherometer. A degree of degradation was expressed by a retention of elongation (%) after an elapse of 400 hours. Furthermore, the degree of discoloration of the test sheets after an elapse of the same period of time as above was visually observed, and a color tone was also described. It is shown that the closer the retention of elongation is to 100 %, the less the degradation by light is. For comparison, the same tests were conducted on a blend of the same formulation except that 0.2 part by weight of a compound having piperidyl groups was used instead of 0.2 part by weight of the mixed product. The results are shown in Table 2.

TABLE 2

| | Run No. | Mixed product or compound having piperidyl group | Discoloration at 180° C. | | Sunshine weatherometer (400 hours) | |
|---|---|---|---|---|---|---|
| | | | 15 min. | 30 min. | Retention of elongation (%) | Color of test piece |
| Example | 1 | A | white | pale yellow | 95 | pale yellow |
| | 2 | B | white | pale yellow | 90 | pale yellow |
| | 3 | D | white | pale yellow | 95 | pale yellow |
| | 4 | E | white | pale yellow | 90 | pale yellow |
| Comparative Example | 1 | a | pale brown | brown | 66 | brown |
| | 2 | d | pale brown | brown | 72 | brown |
| | 3 | e | pale brown | brown | 61 | brown |

EXAMPLES 5–6 and COMPARATIVE EXAMPLES 4–5

In each run, test sheets having a thickness of 0.5 mm were prepared by kneading and then pressing a blend of the below formulation:

| Polyethylene | 100 parts by weight (non-halogen resin) |
|---|---|
| Perchloropenta-cyclodecane | 15 parts by weight (fire retardant of the halogen series) |
| Ca stearate | 1.0 parts by weight |
| Pentaerythrityl-tetrakis-[3-(3,5-di-t-butyl-4-hydroxyphenyl)propionate | 0.2 parts by weight |
| Distearylthiodipropionate | 0.1 parts by weight |
| Mixed product | 0.2 parts by weight |

A period of time till the test sheets brittled (light resistance) was measured using a sunshine weatherometer. Further, a degree of discoloration after an elapse of 500 hours was measured. The results are shown in Table 3.

TABLE 3

| | | Mixed product or compound having piperidyl group | Sunshine weatherometer Light resistance (hours) | Degree of discoloration after an elapse of 500 hrs. |
|---|---|---|---|---|
| Example | 5 | C | 1030 | pale yellow |
| | 6 | F | 1150 | pale yellow |
| Comparative Example | 4 | c | 750 | pale brown |
| | 5 | f | 870 | pale brown |

In Comparative Examples 4 and 5, there was used a blend of the same formulation as in Example 5 except that 0.2 part by weight of the mentioned compound having piperidyl groups was used instead of 0.2 part by weight of the mixed product.

EXAMPLES 714 9 and COMPARATIVE EXAMPLES 6-7

In each run, test sheets having a thickness of 0.5 mm were prepared by kneading and then pressing a blend of the below formulation:

| | |
|---|---|
| Polypropylene | 100 parts by weight (non-halogen resin) |
| Tribromopolystyrene | 10 parts by weight (fire retardant of the halogen series) |
| Ca stearate | 0.3 parts by weight |
| Pentaerythrityl-tetra-kis[3-(3,5-di-t-butyl-4-hydroxyphenyl)propionate | 0.2 parts by weight |
| Mixed product | 0.3 parts by weight |

A period of time till the test sheets brittled (light resistance) was measured using a fadeometer. The results are shown in Table 4.

For comparison, the same tests were conducted on a blend of the same formulation as above except that 0.3 part by weight of a compound having piperidyl groups was used instead of 0.3 part by weight of the mixed product.

TABLE 4

| | | Mixed product or compound having piperidyl group | Light resistance measured by means of a fedeometer (hours) |
|---|---|---|---|
| Example | 7 | A | 610 |
| | 8 | D | 650 |
| | 9 | E | 720 |
| Comparative Example | 6 | a | 450 |
| | 7 | e | 510 |

EXAMPLES 10-12 and COMPARATIVE EXAMPLES 8-9

In each run, test sheets having a thickness of 2 mm were prepared by kneading and then pressing a blend of the below formulation:

| | |
|---|---|
| ABS resin | 100 parts by weight (non-halogen resin) |
| Tetrabromobisphenol A | 9 parts by weight (fire retardant of the halogen series) |
| 4,4'-butyridenebis-(3-methyl-6-t-butyl-phenol) | 0.1 parts by weight |
| Mixed product | 0.2 parts by weight |

A retention of tensile strength of the test sheets after an elapse of 500 hours in a weatherometer was measured. For comparison, the same tests as above were conducted on a blend of the same formulation as above except that 0.2 part by weight of a compound having piperidyl groups was used instead of 0.2 part by weight of the mixed product.

The results are shown in Table 5.

TABLE 5

| | Run No. | Mixed product or compound having piperidyl group | Retention of tensile strength (%) |
|---|---|---|---|
| Example | 10 | C | 81 |
| | 11 | D | 80 |
| | 12 | F | 85 |
| Comparative Example | 8 | c | 55 |
| | 9 | f | 63 |

EXAMPLES 13-16

In each run, test sheets having a thickness of 0.5 mm were prepared by kneading a blend of the below formulation at a temperature of 180° C. using a kneading roll. A retention of elongation and a degree of discoloration after an elapse of 1000 hours were measured using a sunshine weatherometer.

| | |
|---|---|
| Polyvinyl chloride | 70 parts by weight (halogen resin) |
| ABS resin | 30 parts by weight (non-halogen resin) |
| Trisdibromopropyl phosphate | 0.2 parts by weight (fire retardant of the halogen series |
| DOP | 30 parts by weight |
| Calcium carbonate | 10 parts by weight |
| Ba-stearate | 1.0 parts by weight |
| Zn-octoate | 0.5 parts by weight |
| ST-210[1] | 0.5 parts by weight |
| Mixed product C | 0.3 parts by weight |
| Organic phosphite compound | mentioned in Table 6 |

[1] A partial ester of dipentaerythritol dibasic acid, a product of Ajinomoto K.K.

The results are shown in Table 6.

TABLE 6

| Example No. | Organic phosphite compound Type | Amount added (part by weight) | Sunshine weatherometer (1000 hours) Retention of elongation (%) | Color of test piece |
|---|---|---|---|---|
| 13 | Diphenyldecyl phosphite | 0.8 | 70 | pale yellow |
| 14 | Tetra(tridecyl)-4,4'-isopropylidene-diphenyldiphosphite | 0.4 | 65 | pale yellow |
| 15 | Trisnonylphenyl-phosphite | 0.4 | 60 | pale yellow |
| 16 | Distearylpentaery-thritoldiphosphite | 0.2 | 63 | pale yellow |

The mixed products used in Examples 17–44 were prepared as follows using the compound having piperidyl groups mentioned in Table 1.

PREPARATION OF MIXED PRODUCT G

The compound a mentioned in Table 1 (481 g) as the compound having piperidyl groups and 507 g of a hydrotalcite compound $Mg_{4.5}Al_2(OH)_{13} \cdot CO_3 \cdot 3.5H_2O$ (trade name: DHT-4A, a product of Kyowa Chemical Industry Co., Ltd.), as an inorganic substance were mixed with each other for 5 minutes by means of a high-speed Henschel mixer to give 985 g of a mixture (hereinafter referred to as a preparatory mixture).

The preparatory mixture (985 g) and 500 g of methanol were stirred by means of a universal stirrer for a powdery substance into a slurry. Perchloric acid (361 g) was dropwise added to the slurry with stirring. After the dropwise addition, the stirring was continued for 1 hour. The solvent was evaporated, and the residue was pulverized to give a white-colored powdery product G.

PREPARATION OF MIXUTRE PRODUCT H

A preparatory mixture (985 g) prepared in the same formulation as in case of the mixed product G was put in a universal stirrer for a powdery substance and stirred in a state of powdery substance. Perchloric acid (120 g) was dropwise added thereto with stirring. After one hour of the stirring, the mixture was dried under reduced pressure and pulverized to give a white-colored powdery product H.

PREPARATION OF MIXED PRODUCT M

The compound f mentioned in Table 1 (1500 g) as a compound having piperidyl groups and 420 g of $MgCO_3$ and 405 g of $Ca_3(PO_4)_3$ as inorganic substances were mixed with each other for 5 minutes by means of a high-speed Henschel mixer to give 2320 g of a preparatory mixture.

The preparatory mixture (2320 g) and 1000 g of methanol were stirred by means of a universal stirrer for a powdery substance to give a slurry. Perchloric acid (1500 g) was dropwise added bit by bit to the slurry with stirring. When 1500 g of the perchloric acid was dropwise added, the slurry showed a pH of 6.8, and so the dropwise addition of the perchloric acid was terminated. The stirring was further continued for 1 hour. The solvent was evaporated, and the residue was pulverized to give a white-colored powdery product M.

PREPARATION OF MIXED PRODUCT N

A preparatory mixture (2320 g) prepared in the same formulation as in case of the mixed product M was put in a universal stirrer for a powdery substance, and 700 g of perchloric acid was dropwise added thereto. Stirring was carried out for 1 hour. Then, the mixture was dried under reduced pressure and pulverized to give a white-colored powdery product N.

Mixed products I, J, K and L were prepared in the formulations mentioned in Table 7 below in the same way as in case of the mixed products G, H, M and N. In Table 7, there was also mentioned the formulation each of the mixed products G, H, M and N.

TABLE 7

| Mixed product abb. | Compounds having piperidyl group Amount used | Inorganic substance Compound | Amount used | Perchloric acid Amount used |
|---|---|---|---|---|
| G | a | 481 g | DHT-4A | 507 g | 361 g |
| H | " | " | " | " | 120 g |
| I | c | 381 | Alcamizer-4* | 270 | 150 g |
|   |   |   | $SiO_2$ | 100 |   |
| J | " | " | $Ca(OH)_2$ | 110 | 240 g |
|   |   |   | Al powder | 9 |   |
| K | d | 685 | $Ba(OH)_2 \cdot BaSO_4$ | 202 | 210 g |
| L | e | 250 | DHT-4A | 507 | 250 g |
|   |   |   | $3SnO \cdot Sn_3(PO_4)_2$ | 158 |   |
| M | f | 150 | $MgCO_3$ | 42 | 150 g |
|   |   |   | $Ca_3(PO_4)_3$ | 41 |   |
| N | " | 150 | $MgCO_3$ | 42 | 70 g |
|   |   |   | $Ca_3(PO_4)_3$ | 41 |   |

*Alcamizer-4, the trade name of a product of Kyowa Chemical Industry Co., Ltd. (a hydrotalcite compound in which part of Mg is substituted with Zn)

EXAMPLES 17 14 23 and COMPARATIVE EXAMPLES

In each run, test sheets having a thickness of 0.5 mm were prepared by means of a kneading roll using a blend of the below formulation:

| | |
|---|---|
| Polyvinyl chloride | 100 parts by weight |
| DOP | 40 parts by weight |
| Epoxidized soybean oil | 2.0 parts by weight |
| $TiO_2$ | 0.5 parts by weight |
| Ba-nonylphenate | 0.7 parts by weight |
| Zn-stearate | 0.3 parts by weight |
| Mixed product mentioned in Table 8 | mentioned in Table 8 |

The test sheets were examined for discoloration under the conditions of 180° C., 15 minutes and 30 minutes using a Gear oven, and a degree of discoloration was visually judged. Degradation by light was measured using a sunshine weatherometer. A degree of degradation was expressed by a retention of elongation (%) after an elapse of 800 hours. The degree of discoloration of the test sheets after an elapse of the same period of time was visually observed, and a color tone has also been described. It is shown that the closer the retention of elongation is to 100 %, the less the degradation by light is. For comparison, the same tests as above were conducted on preparatory mixtures corresponding to the mixed products prior to preparation with perchloric acid. The results are shown in Table 8.

In Table 8, G-N in the column of types of mixed products respectively denote the mixed products mentioned in Table 7, G'-N' denote corresponding preparatory mixtures (mixed products of a compound having piperidyl groups and an inorganic substance; The same applies to the following.), and a denotes the compound having piperidyl groups mentioned in Table 1.

TABLE 8

| | Mixed product | | Discoloration at 180° C. | | Sunshine weatherometer (800 hours) | |
|---|---|---|---|---|---|---|
| Run No. | Type | Amount of the product used | 15 min. | 30 min. | Retention of elongation (%) | Color of test piece |
| Example | | | | | | |
| 17 | G | 0.2 | white | pale yellow | 90 | pale yellow |
| 18 | H | 0.2 | " | " | 87 | " |

TABLE 8-continued

| Run No. | Mixed product Type | Amount of the product used | Discoloration at 180° C. 15 min. | 30 min. | Sunshine weatherometer (800 hours) Retention of elongation (%) | Color of test piece |
|---|---|---|---|---|---|---|
| 19 | I | 0.2 | " | " | 90 | " |
| 20 | J | 0.2 | " | " | 85 | " |
| 21 | K | 0.2 | " | " | 83 | " |
| 22 | L | 0.2 | " | " | 92 | " |
| 23 | M | 0.2 | " | " | 90 | " |
| 24 | N | 0.2 | " | " | 85 | " |
| Comparative Example | | | | | | |
| 10 | G' | 0.2 | pale yellow | brown | 65 | brown |
| 11 | H' | 0.2 | " | " | 60 | " |
| 12 | I' | 0.2 | " | " | 67 | " |
| 13 | J' | 0.2 | " | " | 60 | " |
| 14 | K' | 0.2 | " | " | 65 | " |
| 15 | L' | 0.2 | " | " | 73 | " |
| 16 | M' | 0.2 | " | " | 65 | " |
| 17 | N' | 0.2 | " | " | 60 | " |
| 18 | a | 0.1 | " | " | 58 | " |
| 19 | a | 0.2 | " | " | 75 | " |

EXAMPLES 24–27 and COMPARATIVE EXAMPLES 20–23

In each run, test pieces were prepared by extrusion molding using a blend of the below formulation:

| | |
|---|---|
| Polyethylene | 100 parts by weight |
| Ca stearate | 1.0 parts by weight |
| Pentaerythrityl-tetra-kis[3-(3,5-di-t-butyl-4-hydroxyphenyl) propionate | 0.2 parts by weight |
| Dilaurylthiodipropionate | 0.1 parts by weight |
| Mixed product | 0.2 parts by weight |

A period of time till the test pieces brittled (light resistance) was measured using a sunshine weatherometer. A degree of discoloration after an elapse of 800 hours was measured. The results are shown in Table 9. For comparison, the same tests as above were conducted on preparatory mixtures, and the results are also shown in Table 9.

TABLE 9

| Run No. | Mixed product | Sunshine weatherometer Light resistance (hours) | Degree of discoloration after an elapse of 800 hrs. |
|---|---|---|---|
| Example | | | |
| 24 | G | 1600 | white |
| 25 | I | 1500 | white |
| 26 | K | 1650 | white |
| 27 | M | 1450 | white |
| Comparative Example | | | |
| 20 | G' | 1100 | pale yellow |
| 21 | I' | 1000 | pale yellow |
| 22 | K' | 1100 | pale yellow |
| 23 | M' | 900 | pale yellow |

EXAMPLES 28–31 and COMPARATIVE EXAMPLES 24–31

In each run, test sheets having a thickness of 0.5 mm were prepared by kneading and then press molding using a blend of the below formula:

| | |
|---|---|
| Polypropylene | 100 parts by weight |
| Ca stearate | 0.5 parts by weight |

-continued

| | |
|---|---|
| Pentaerythrityl-tetra-kis[3-(3,5-di-t-butyl-4-hydroxyphenyl) propionate | 0.3 parts by weight |
| Mixed product (in Table 10) | Mentioned in Table 10 |

A period of time till the test sheets brittled (light resistance) was measured using a fadeometer. The results are shown in Table 10. For comparison, the same tests as above were conducted on preparatory mixtures respectively corresponding to the mixed products and compounds having piperidyl groups. The results are also shown in Table 10.

TABLE 10

| Run No. | Mixed product Type | Amount of product used | Light resistance measured by means of a fadeometer (hours) |
|---|---|---|---|
| Example | | | |
| 28 | H | 0.2 | 1100 |
| 29 | J | 0.2 | 1200 |
| 30 | L | 0.2 | 1000 |
| 31 | N | 0.2 | 1100 |
| Comparative Example | | | |
| 24 | H' | 0.2 | 500 |
| 25 | J' | 0.2 | 550 |
| 26 | L' | 0.2 | 400 |
| 27 | N' | 0.2 | 550 |
| 28 | c | 0.1 | 550 |
| 29 | f | 0.1 | 600 |
| 30 | c | 0.2 | 850 |
| 31 | f | 0.2 | 900 |

EXAMPLES 32–37 and COMPARATIVE EXAMPLES 32–37

In each run, test press pieces were prepared using a blend of the below formulation containing a fire retardant:

| | |
|---|---|
| Polypropylene | 100 parts by weight |
| Fire retardant of the halogen series (types in Table 11) | 10 parts by weight |
| Ca stearate | 1.0 parts by weight |
| Dioctyl Sn maleate | 1.0 parts by weight |

| | | | -continued |
|---|---|---|---|
| Pentaerythrityl-tetra-kis[3-(3,5-di-t-butyl-4-hydroxyphenyl) propionate | | | 0.2 parts by weight |
| Mixed product (in Table 11) | | | 0.3 parts by weight |

A period of time till the test pieces brittled (light resistance) was measured using a fadeometer. The results are shown in Table 11.

TABLE 11

| Run No. | Fire retardant | Mixed product | Light resistance measured by means of a fadeometer (hours) |
|---|---|---|---|
| Example | | | |
| 32 | perchloropentacyclodecane | G | 800 |
| 33 | perchloropentacyclodecane | J | 850 |
| 34 | perchloropentacyclodecane | L | 700 |
| Comparative Example | | | |
| 32 | perchloropentacyclodecane | G' | 450 |
| 33 | perchloropentacyclodecane | J' | 500 |
| 34 | perchloropentacyclodecane | L' | 400 |
| Example | | | |
| 35 | tribromopolystyrene | G | 900 |
| 36 | tribromopolystyrene | J | 920 |
| 37 | tribromopolystyrene | L | 850 |
| Comparative Example | | | |
| 35 | tribromopolystyrene | G' | 500 |
| 36 | tribromopolystyrene | J' | 550 |
| 37 | tribromopolystyrene | L' | 450 |

EXAMPLES 38–40 and COMPARATIVE EXAMPLE 38–40

In each run, test sheets having a thickness of 2 mm were prepared by kneading and then press molding using a blend of the below formulation:

| | |
|---|---|
| ABS resin | 100 parts by weight |
| 4,4'-butylidenebis(3-methyl-6-t-butylphenol) | 0.2 parts by weight |
| Mixed product | 0.3 parts by weight |

A retention of tensile strength after an elapse of 1000 hours was measured using a weatherometer. The results are shown in Table 12. For comparison, the same tests as above were conducted on preparatory mixtures. The results are also mentioned in Table 12.

TABLE 12

| Run No. | Measured product | Retention of tensile strength (%) |
|---|---|---|
| Example | | |
| 38 | G | 85 |
| 39 | I | 80 |
| 40 | K | 83 |
| Comparative Example | | |
| 38 | G' | 50 |
| 39 | I' | 40 |
| 40 | K' | 45 |

EXAMPLES 41–44

In each run, when the mixed product having an average particle diameter of 35 μm in this invention was further finely pulverized into a mixed product having an average particle diameter of 10 μm or less, there was given a further improved effect.

Test sheets having a thickness of 0.5 mm were prepared by means of a kneading roll using a blend of the below formulation:

| | |
|---|---|
| Polyvinyl chloride | 70 parts by weight |
| ABS resin | 30 parts by weight |
| Trisbromopropylphosphate (fire retardant of the halogen series) | 0.3 parts by weight |
| $Sb_2O_3$ (fire retardant aid) | 1.0 parts by weight |
| DOP | 40 parts by weight |
| Calcium carbonate | 10 parts by weight |
| Ba nonylphenate | 1.0 parts by weight |
| Zn octate | 0.5 parts by weight |
| ST-210* | 0.5 parts by weight |
| Mixed product (in Table 13) | 0.4 parts by weight |

*A partial ester of dipentaerythritol dibasic acid, a product of Ajinomoto K. K.

A retention of elongation after an elapse of 100 hours and a degree of discoloration were measured using a sunshine weatherometer. The results are shown in Table 13.

TABLE 13

| | Mixed product | | Sunshine weatherometer (1000 hours) | |
|---|---|---|---|---|
| Example | Type | Average particle diameter | Retention of elongation (%) | Color of test piece |
| 41 | I | 9 μm | 70 | pale yellow |
| 42 | M | 7 μm | 75 | pale yellow |
| 43 | I | 35 μm | 53 | yellow |
| 44 | M | 35 μm | 60 | yellow |

We claim:
1. A synthetic resin composition comprising:
   (A) 100 parts by weight of a synthetic resin; and
   (B) 0.01 –10 parts by weight of a mixed product of
      (a) a compound having at least one piperidyl group and
      (b) perchloric acid
      (c) optionally, an inorganic substance other than perchloric acid.
2. The composition of claim 1 wherein the synthetic resin (A) is a polyolefin resin or a styrene resin.
3. The composition of claim 1 wherein the compound having at least one piperidyl group is a compound having 1 to 4 piperidyl groups in the molecule.
4. The composition of claim 1 wherein the compound having at least one piperidyl group is expressed by the below formulated (1):

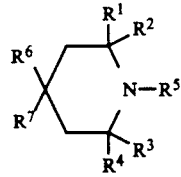

wherein $R^1$, $R^2$, $R^3$ and $R^4$ are identical or different and each denote a hydrogen atom or an alkyl group having 1-4 carbon atoms; $R^5$ denotes a hydrogen tom, an alkyl group having 1-4 carbon atoms, a hydroxyalkyl group having 2-4 carbon atoms or an acyl group having 2-4 carbon atoms; and $R^6$ and $R^7$ are identical or different and each denote a monovalent organic group, for example, an acyloxy group and a substituted amino group, or $R^6$ and $R^{78}$ may together form a substituted alkylenedioxy group.

5. The composition of claim 1 wherein the mixed product (B) is a mixed product of 1 part by weight of the compound and 0.05-19 parts by weight of the perchloric acid.

6. The composition of claim 1 wherein the mixed product (B) is a powdery substance having an average particle diameter of 100-1 μm.

7. The composition of claim 1 containing a fire retardant.

8. The composition of claim 7 containing as a fire retardant a fire retardant of the halogen series.

9. The composition of claim 1 further containing a fire retardant of the halogen series.

* * * * *